United States Patent [19]

Armstrong

[11] Patent Number: 5,305,843
[45] Date of Patent: Apr. 26, 1994

[54] POWER DRIVEN WHEEL BARROW

[76] Inventor: Leonard J. Armstrong, 138 Royal Oak Rd., Staten Island, N.Y. 10314

[21] Appl. No.: 996,635

[22] Filed: Dec. 24, 1992

[51] Int. Cl.⁵ .............................................. B62D 51/04
[52] U.S. Cl. ..................................... 180/19.1; 180/351
[58] Field of Search ..................... 180/13, 19.1, 19.3, 180/58, 292, 293, 339, 351, 357; 280/653; 298/3

[56] References Cited

U.S. PATENT DOCUMENTS

| | | | |
|---|---|---|---|
| 2,239,122 | 4/1941 | Stokes | 180/19.1 |
| 2,253,288 | 8/1941 | De Lucchi | 180/19.1 |
| 2,464,980 | 3/1949 | Kuehn | 180/13 X |
| 2,530,941 | 11/1950 | Devirian, Jr. | 180/13 X |
| 2,533,549 | 12/1950 | Bell | |
| 2,535,614 | 12/1950 | Van Ausdall | 180/19.1 |
| 2,638,172 | 5/1953 | Borchin et al. | |
| 2,731,096 | 1/1956 | Thelander | 180/13 X |
| 2,918,133 | 12/1959 | Ericsson | |
| 3,021,625 | 2/1962 | Stasse | |
| 3,791,470 | 2/1974 | Baddore et al. | 180/19 |
| 3,891,043 | 6/1975 | Valdex | 180/13 |
| 4,144,944 | 3/1979 | Aplin, Sr. | 180/19.1 X |
| 4,280,580 | 7/1981 | Wojcik | 180/169 |
| 4,589,508 | 5/1986 | Hoover et al. | 180/19.1 |
| 4,700,427 | 10/1987 | Knepper | 318/587 X |
| 5,109,566 | 5/1992 | Kobayashi et al. | 180/169 X |
| 5,199,996 | 4/1993 | Jones et al. | 15/319 X |
| 5,208,521 | 5/1993 | Aoyama | 180/169 X |
| 5,211,254 | 5/1993 | Harris, III et al. | 180/19.1 |

FOREIGN PATENT DOCUMENTS

| | | | |
|---|---|---|---|
| 464425 | 10/1973 | Australia | 180/19.1 |
| 45283 | 2/1974 | Australia | 180/19.1 |
| 648599 | 9/1962 | Canada | 180/19.1 |
| 106478 | 7/1967 | Denmark | 180/19.1 |
| 2366972 | 5/1978 | France | 180/19.1 |
| 544065 | 3/1942 | United Kingdom | 180/19.1 |

*Primary Examiner*—Brian L. Johnson
*Attorney, Agent, or Firm*—Fitzpatrick, Cella, Harper & Scinto

[57] ABSTRACT

A power driven wheel barrow includes a pair of frame members, the pair of frame members being connected at a front portion thereof, a drive wheel rotatably mounted at the front portion of the frame members, a motor for providing rotational motion to a first shaft about an axis having a direction substantially normal to a direction of an axis of rotation of the drive wheel, a sealed gear box for converting the rotational motion provided by the first shaft to a direction substantially parallel to the direction of rotation of the drive wheel and outputting the converted rotational motion and a roller for selectively engaging and disengaging the rotational motion output by the sealed gear box to and from the drive wheel.

8 Claims, 6 Drawing Sheets

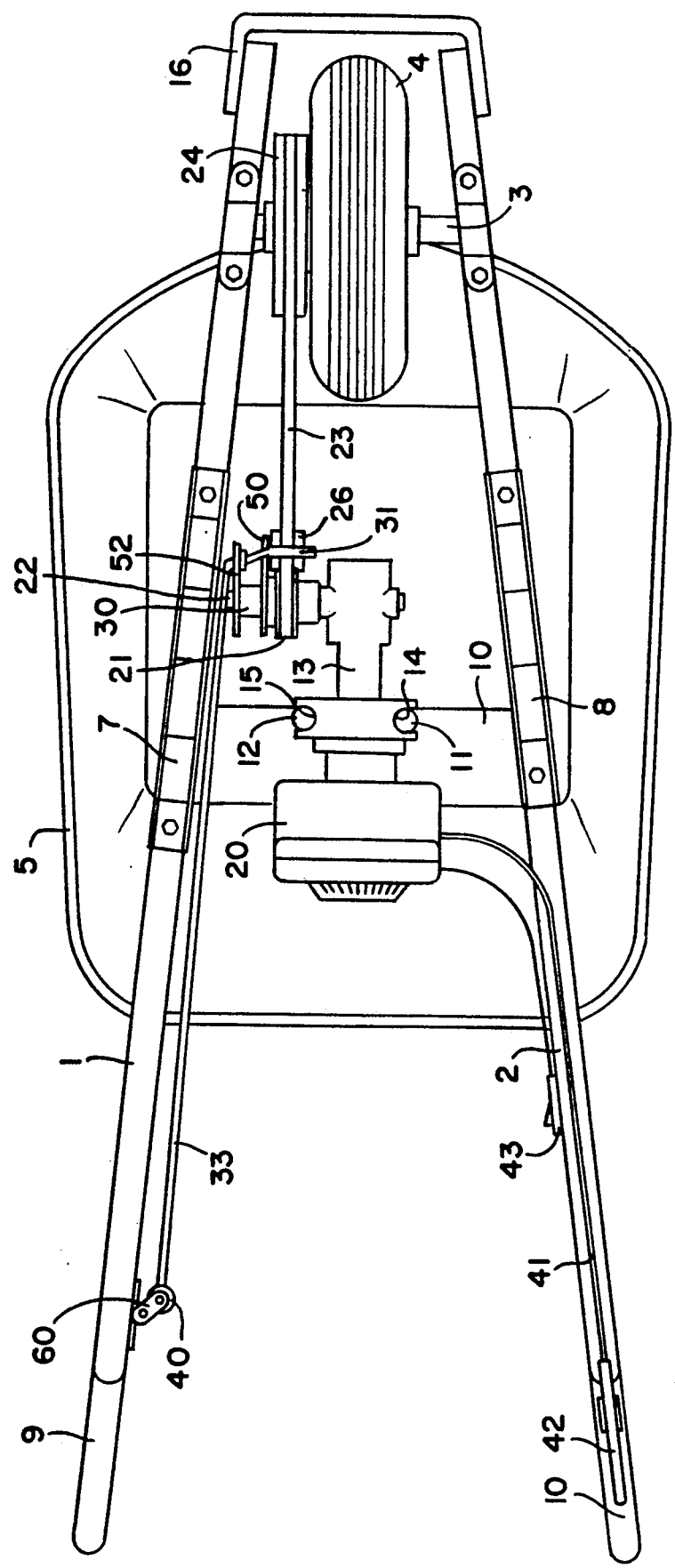

POWER DRIVEN WHEEL BARROW

BACKGROUND OF THE INVENTION

1. Field of the Invention

The present invention relates to devices used for carrying items and, more particularly, to wheel barrow type devices generally comprising a single wheeled vehicle having a bucket for holding refuse, cement, tools, etc.

2. Description of the Prior Art

Wheel barrows have been extensively used for carrying cement, refuse, tools and other such items. A basic wheel barrow device consists of a standard frame formed from a pair of generally straight frame members that converge toward a front portion of the device. A wheel is rotatably mounted to a bottom of the frame members at the converged front portion of the device. A bucket is mounted on top of the frame members rearwardly from the front portion at which the wheel is mounted. The diverging rear portions of the frame members form handles for lifting and guiding the wheel barrow. V-shaped supports are generally provided on the bottom side of the frame members below the bucket for supporting the rear portion of the wheel barrow so that the bucket remains substantially parallel to the ground when at rest.

A typical wheelbarrow is arranged such that when it is being pushed a substantial portion of the weight of the load in the bucket is pivoted and balanced over the wheel. This enables an operator of the wheel barrow to push and guide the wheel barrow without bearing the entire weight of the load.

A large wheel barrow, that is a wheel barrow having a large bucket, can carry several hundred pounds of refuse or material. On smooth, level or slightly downhill grades, a fully loaded wheel barrow is fairly easy to maneuver, although the initial force necessary to set the wheel barrow in motion may be great. However, when a fully loaded wheel barrow is used on rough or uphill grades, it is often difficult to keep the wheel barrow in motion and an operator pushing the wheel barrow must expend a large amount of energy. On the other hand, on large downhill grades the opposite is true and it is often difficult to slow the wheel barrow down to a speed at which it is easy and safe to control the wheel barrow.

Various approaches have been taken to provide a power-driven wheel barrow for removing some of the burden involved with moving a wheel barrow over rough or uneven terrain. Several approaches involve adding a motor and a simple direct chain or belt between the motor and the drive wheel of the wheel barrow for providing a drive force for moving the wheel barrow. However, these approaches generally involve the use of lengthy chains or belts or in some cases, the use of several chains or belts. One disadvantage of such approaches is that debris often interferes with the drive mechanism making the operation and maintenance of the device difficult. In addition, relatively large and heavy engines are generally used in such approaches and this adds significantly to the overall weight of the wheel barrow. Also, such direct drives often do not allow the motor to be disengaged from the main drive wheel and the wheel barrow can not be used as an ordinary push-type wheel barrow. This is particularly inconvenient when the load being carried is light weight and does not necessitate the power drive. In addition, since the only practical location to place the relatively heavy engine and drive mechanism is below the bucket and behind the main wheel, the extra weight of the engine and drive mechanism may not be conveniently pivoted and balanced over the main wheel when an operator is pushing the wheel barrow. Accordingly, the operator must bear the burden of carrying the extra weight of the engine and drive mechanism.

Several prior art approaches involve adding extra wheels to a rear of the wheel barrow to relieve some of the burden on the operator from having to carry the added weight. However, since it is often required to use the wheel barrow in confined areas or even on a narrow plank or path, such multi-wheeled wheel barrows have limited utility.

Another approach is discussed in U.S. Pat. No. 4,589,508 and consists of a motorized wheel barrow including a friction drive transmission. The friction transmission consists of a friction wheel driven by an engine by use of a chain and sprockets. The friction wheel rotates in a clockwise direction in a horizontal plane. The friction wheel is movable to the right and left to engage either one of two friction drive plates provided one on either side of the friction wheel. The drive plates are connected to each other through an intermediate cylinder and a sprocket is attached to an outside end of one of the drive plates for driving a chain attached to the main drive wheel of the wheel barrow. When the friction wheel is moved to the right, it engages one of the drive plates and the sprocket on the drive plate assembly and the main drive wheel of the wheel barrow are rotated in a first direction. When the friction wheel is moved to the left, it engages the other drive plate and the sprocket on the drive plate assembly and the main drive wheel of the wheel barrow are rotated in a direction opposite to the first direction.

However, since wheel barrows are often used in an environment that is wet, muddy or dirty, one disadvantage of such a friction drive transmission is that if the drive plates get wet or get some other debris on them, the friction wheel may slip which could cause a sudden loss of drive to the main drive wheel. A sudden loss of drive to the main drive wheel, particularly when climbing an uphill grade, could cause loss of control and cause the load in the wheel barrow to shift and cause spilling of the load or even injury. In addition, since the relatively heavy engine and extra gearing required by such a friction drive device add considerably to the overall weight of the device, it is difficult to tip the entire wheel barrow. Accordingly an arm is provided for manually lifting just the bucket to enable manual dumping of the contents of the bucket without having to lift the engine. This requires even more hardware and further modifications to the wheel barrow adding to the overall cost and weight of the device.

SUMMARY OF THE INVENTION

It is an object of the present invention to provide a lightweight drive device that is easily attachable to a conventional wheel barrow for converting the conventional wheel barrow to a power driven wheel barrow.

It is still another object of the present invention to provide a lightweight power driven wheel barrow that is operable as either a power driven wheel barrow or as an ordinary push-type wheel barrow.

In accordance with an aspect of the present invention, a power driven wheel barrow includes a pair of frame members connected at a front portion thereof. A drive wheel is rotatably mounted at the front portion of the frame members and a motor provides rotational motion to a first shaft about an axis having a direction substantially normal to a direction of an axis of rotation of the drive wheel. A sealed gear box converts the rotational motion provided by the first shaft to a direction substantially parallel to the direction of rotation of the drive wheel and outputs the converted rotational motion. The sealed gear box and the motor are attached to each other to form a unit. Means are provided for selectively engaging and disengaging the rotational motion output by the sealed gear box means to and from the drive wheel.

In an embodiment of the present invention the sealed gear box includes a worm shaft for delivering the rotational motion from the first shaft to a second shaft for providing rotational motion to the second shaft wheel in the direction substantially parallel to the direction of rotation of the drive wheel.

In another embodiment, the sealed gear box includes a worm shaft for delivering the rotational motion from the first shaft to a worm wheel, the worm wheel delivering rotational motion to a second shaft in the direction substantially parallel to the direction of rotation of the drive wheel. The second shaft is slidably mounted through the worm wheel and the second shaft engages the worm wheel in a first position for operating the device as a power-driven wheel barrow. The second shaft does not engage the worm wheel in a second position so that the device can be operated as an ordinary push-type wheel barrow.

According to still another embodiment of the present invention, the worm wheel comprises a first half and a second half, and the worm shaft meshes with the worm wheel when the first and second halves are brought together and does not mesh with the worm wheel when the first and second halves are separate, so that the device can be selectively operated as a push-type or a power-driven wheel barrow.

BRIEF DESCRIPTION OF THE DRAWINGS

The various aspects of the present invention can be understood by reference to the detailed description of preferred embodiments set forth below taken with the drawings, in which:

FIG. 2 is a bottom view of the embodiment depicted in FIG. 1.

DETAILED DESCRIPTION OF PREFERRED EMBODIMENTS

The present invention relates to a drive device which is easily attached to a conventional wheel barrow with a few minor and simple modifications to the wheel barrow, so that a motorized drive can be provided on any conventional wheel barrow.

Figure 1:
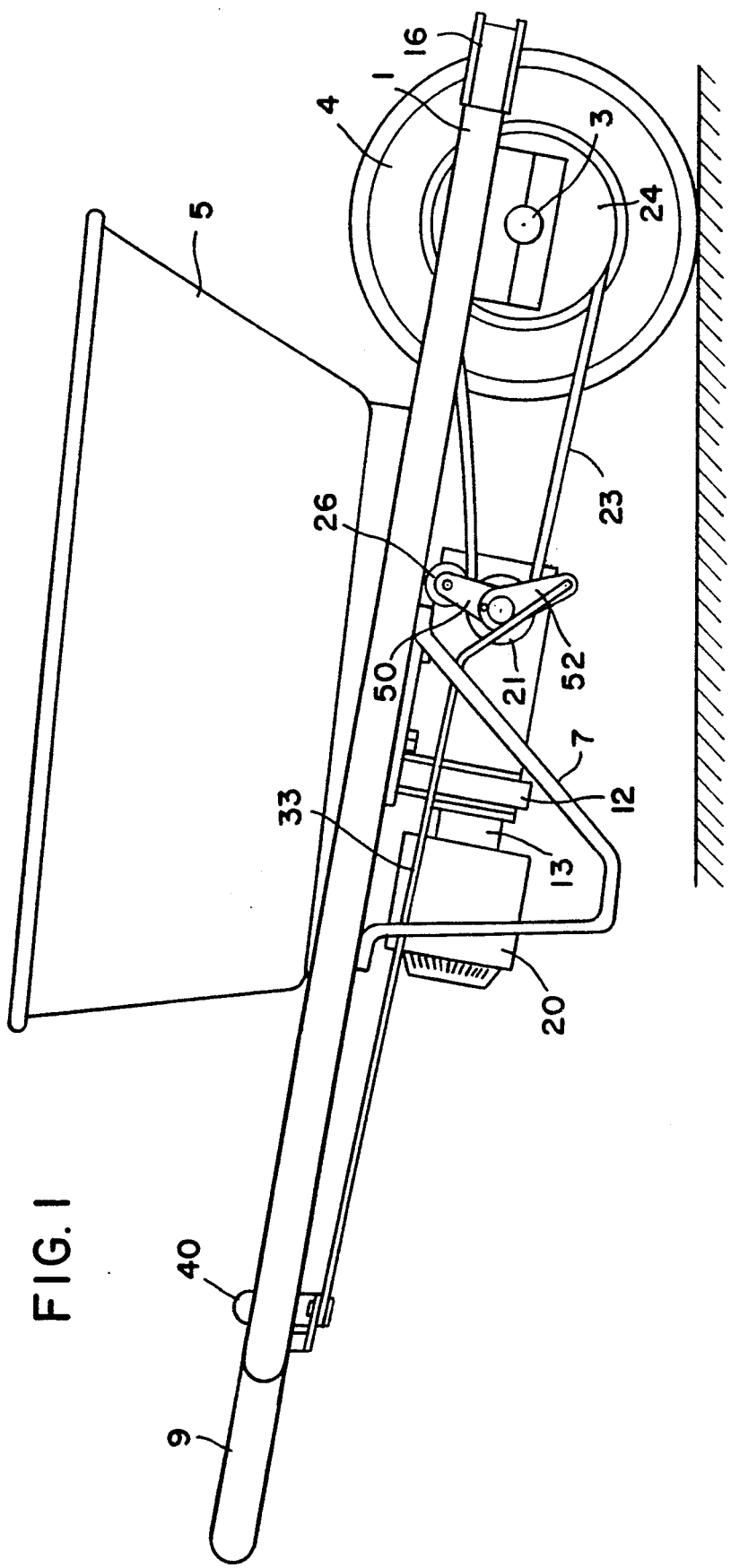
FIG. 1 is a side view of an embodiment of the present invention.

FIGS. 1 and 2 are views of a conventional wheel barrow including a preferred embodiment of the present invention. The conventional wheel barrow includes converging frame members 1 and 2 connected by bracket 16 at the converging front portion to form an A-frame. An axle 3 is mounted to the frame members by use of any suitable clamp or bracket at a front portion of the A-frame. Drive wheel 4 is rotatably mounted on axle 3. A bucket 5 is mounted on a top portion of the A-frame. V-shaped supports 7 and 8 support the rear of the wheel barrow when the wheel barrow is at rest. Handles 9 and 10 provide convenient grips so that the operator can push and guide the wheel barrow.

A first embodiment of the drive unit used in the present invention is clearly shown in FIG. 2. The drive unit consists of a mounting bracket 10 extending between frame members 1 and 2 at a position near a rear end of the bucket 5. The mounting bracket 10 is connected to frame members 1 and 2 by use of four lag bolts (not shown) passing through frame members 1 and 2 and mounting bracket 10. Mounting bracket 10 has two pins 11 and 12 extending downwardly therefrom. Gear box 13 has a casing which includes half circle lands 14 and 15 that slide onto and engage pins 11 and 12. Two bolts slide through corresponding holes provided in gear casing 13 and pins 11 and 12, for securing the gear box to the wheel barrow. A gasoline powered engine 20 is mounted directly to gear casing 13 with four bolts.

The engine is mounted directly to the gear box using the standard mounting holes provided on the engine frame around the output drive shaft of the engine. The engine and gear box thus form a lightweight drive unit. Accordingly, a compact self-contained drive unit can be easily and efficiently provided. The self-contained drive unit can be easily removed from the wheel barrow and replaced by simply removing the two bolts holding the gear casing to pins 11 and 12, or by removing the four lag bolts holding mounting bracket 10 to the frame.

The engine 20 consists of a lightweight gasoline powered two cycle engine. A gas tank (not shown) is mounted directly to the engine. A centrifugal clutch is provided between engine 20 and gear box 13. The centrifugal clutch provides rotational drive force from the engine 20 to the gear box 13. The centrifugal clutch is a standard type clutch used in devices driven by relatively small two cycle engines such as the one used in this embodiment. Accordingly, a detailed description of the centrifugal clutch is not provided.

Gear box 13 converts the rotational motion delivered by the drive shaft (not shown) of engine 20, the axis of rotation of which is substantially normal to the direction of an axis of rotation of drive wheel 4, to a direction substantially parallel to the direction of rotation of drive wheel 4. Gear box 13 delivers the power supplied from engine 20 relatively close to drive wheel 4 so that only a short belt or chain is required for delivering power from output shaft 22 of the gear box 13 to drive wheel 4. Since gear box 13 is a self contained sealed unit, debris and foreign substances cannot interfere with the gearing in gear box 13, thus avoiding slippage or interference with the gears. A pulley 21 is attached to output shaft 22 of gear box 13. Pulley 21 rotates belt 23 which extends from pulley 21 to pulley 24 attached to drive wheel 4.

Belt 23 is normally slack so that drive wheel 4 can freely spin with no resistance from gear box 13 or engine 20. When belt 23 is slack, the wheel barrow can be used as a typical push-type wheel barrow. Engaging roller 26 can be selectively moved to provide tension on belt 23 to remove the slack so that the rotational motion of pulley 21 provided by engine 20 through gear box 13 is imparted to rotate drive wheel 4. Engaging roller 26 follows the contour of pulley 21 providing a maximum arc of contact between roller 26 and belt 23. Output shaft 22 extends from gear case 13 a sufficient distance to allow pulley 21 to be mounted to output shaft 22 by any suitable means. In addition, belt crank 30 slides onto output shaft 22. Output shaft 22 serves as a support for belt crank 30 so that belt crank 30 can pivot about output shaft 22. Belt crank 30 is held onto output shaft 22 by use of a cotter pin provided through the end of drive shaft 22. Roller 26 is rotatably mounted to an arm 50 extending from belt crank 30. Roller 26 contacts belt 23 when moved into position by control arm 33 and provides tension on belt 23. Control arm 33 consists of a resilient length of steel, one end of which is pivotally mounted to arm 52 provided on belt crank 30. Control arm 33 can be manually moved for selectively moving roller 26 into and out of contact with belt 23. Control arm 33 extends through arm 52 to form an extension arm 31. Extension arm 31 extends to a position below belt 23 for supporting and preventing belt 23 from hanging too low when tension is removed from the belt. Accordingly, unnecessary resistance caused by gravity acting on the belt is not applied to pulleys 21 and 24. Control arm 33 extends from arm 52 of belt crank 30 to a pivoting mounting bracket 60 provided at a position near handle 9 of frame member 1. Handle 40 is provided on control arm 33 such that an operator can manually move control arm 33. When control arm 33 is moved to the position shown in FIG. 2, engaging roller 26 is in a position not contacting belt 23. Control arm 33 can also be manually moved to a position so that engaging roller 26 contacts belt 23 and provides tension on the belt and the device can be used as a power-driven wheel barrow. This is accomplished by pivoting mounting bracket 60 toward handle 9. When tension is applied to belt 23, the rotational motion from pulley 21 is transmitted to pulley 24 and drive wheel 4. When handle 40 is pivoted in a clockwise direction toward handle 9 (as viewed in FIG. 2), the handle reaches a point where it locks in place due to a spring force provided by resilient control arm 33.

An end of throttle cable 41 is connected to the throttle control of engine 20 for controlling the speed of engine 20. The other end of throttle cable 41 is connected to a throttle lever 42. Throttle lever 42 is pivotally mounted on frame member 2 near handle 10 and is provided in a position so that it can be easily reached by the operator without the operator having to release his grip on the handle. Kill switch 43 is connected to the ignition of engine 20 for interrupting the ignition to the engine and stopping the engine. The gear ratio between pulley 24 and pulley 21 is approximately 6 to 1.

Figure 3A:
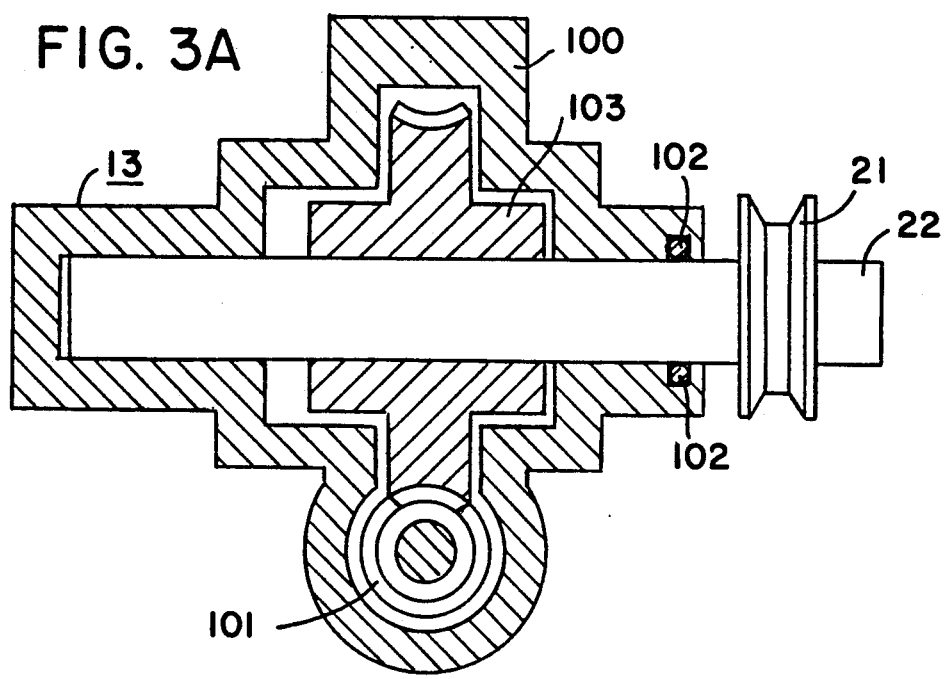
FIGS. 3A and 3B are cross-sectional views of a gear box used in a belt driven embodiment of the present invention.
Figure 3B:
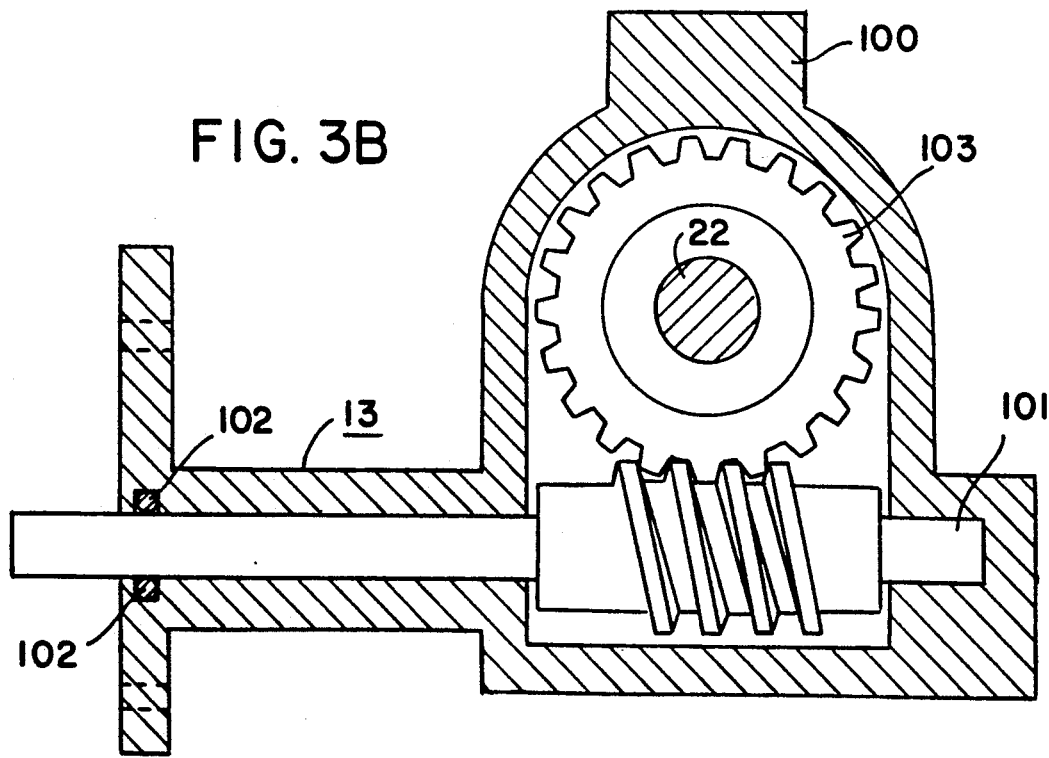

Gear box 13 is shown in more detail in FIGS. 3A and 3B. FIG. 3A is a cross-sectional view of gear box 13 as viewed from the front of the wheel barrow (near wheel 4) looking toward engine 20. Gear box 13 includes a housing 100 for housing a series of gears and shafts. Housing 100 is a sealed unit and contains oil, grease or any other type of suitable lubricant for lubricating the gears and shafts. As shown in FIG. 3B, worm shaft 101 is rotatably mounted in housing 100 to be rotated and driven by engine 20. O rings 102 prevent the lubricant in housing 100 from leaking from the housing. Worm shaft 101 meshes with worm wheel 103, so that when engine 20 rotates worm shaft 101 in a counter-clockwise direction as viewed in FIG. 3A, worm wheel 103 rotates in a direction for propelling the wheel barrow in a forward direction. Worm wheel 103 is attached to output shaft 22 so that output shaft 22 rotates along with worm wheel 103. Worm wheel 103 can be attached to output shaft 22 in any suitable manner. For example, worm wheel 103 can be fastened to output shaft 22 by use of a roll pin or set screw. The gear ratio between worm wheel 103 and worm shaft 101 is approximately 15 to 1. Since the gear ratio between pulley 24 and pulley 21 is approximately 6 to 1, the overall gear ratio between the output shaft of engine 20 and drive wheel 4 is approximately 90 to 1.

The configuration as shown in FIGS. 1-3 provides a lightweight, powerful and self-contained power unit that can be adapted to fit any conventional wheel barrow, using only four lag bolts and by making several only minor attachment modifications to the wheel barrow. Since the gearing for the drive unit is provided in a self contained sealed container, there is no risk of dirt or debris interfering with the gearing. In addition, since gear box 13 releases the power from the engine relatively close to drive wheel 4, and since release of the power by gear box 13 is not through chains, sprockets, etc., excessive friction drag is avoided. In addition, since the drive is delivered close to the drive wheel, a relatively short belt or chain can be used which reduces the risk of debris interfering with the belt or chain. Of course, a chain guard can be added to the wheel barrow for further reducing the risk of debris interfering with the drive unit. The gearing in the gear box is non-reversible and therefore prevents loss of control on steep grades.

The engine, gear box and accompanying hardware add approximately only twenty pounds to the overall weight of the wheel barrow, so that the weight is hardly noticeable by the operator of the wheel barrow. The wheel barrow can thus be easily used as a conventional push-type wheel barrow or as a power-driven wheel barrow. In addition, since the engine and gear box form a compact unit, they can be mounted relatively close to the bucket and, accordingly, they do not interfere with the ground clearance of the wheel barrow.

When a wheel barrow having a large bucket is used for moving heavy loads, or when the wheel barrow is to be operated in an environment in which the belt drive may become excessively wet and slippery, the belt drive system may not be sufficient since the belt may tend to slip due to the extra weight being pulled or due to the slippery conditions. Accordingly, a more direct chain drive may be needed.

Figure 4:
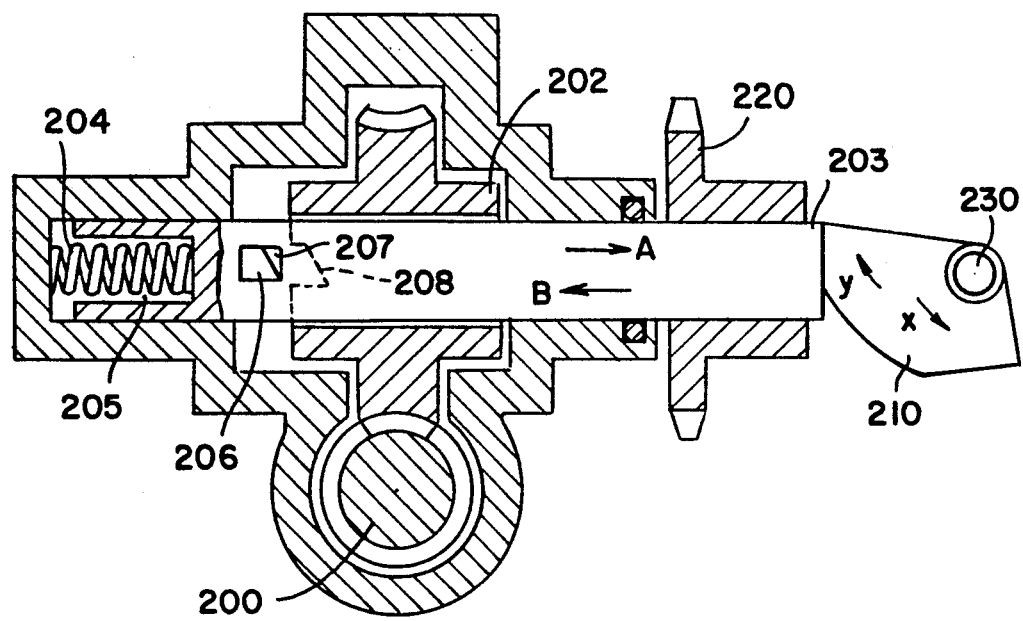
FIGS. 4 and 5 are cross-sectional views of a gear box used in a chain driven embodiment of the present invention.
Figure 5:
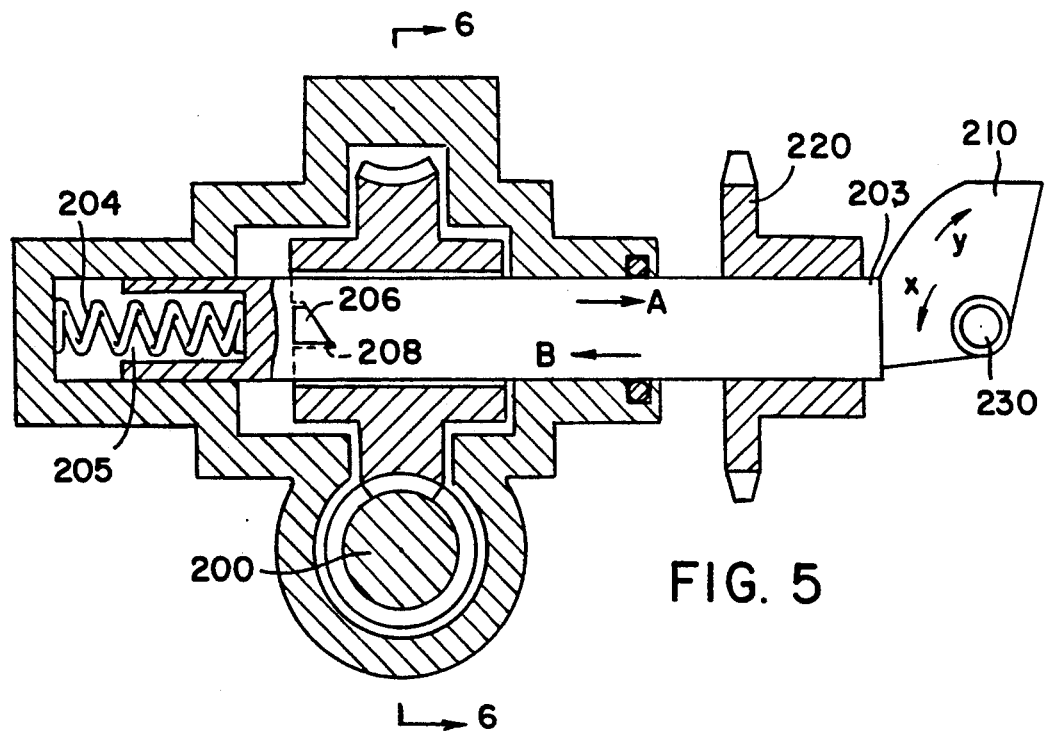
Figure 6:
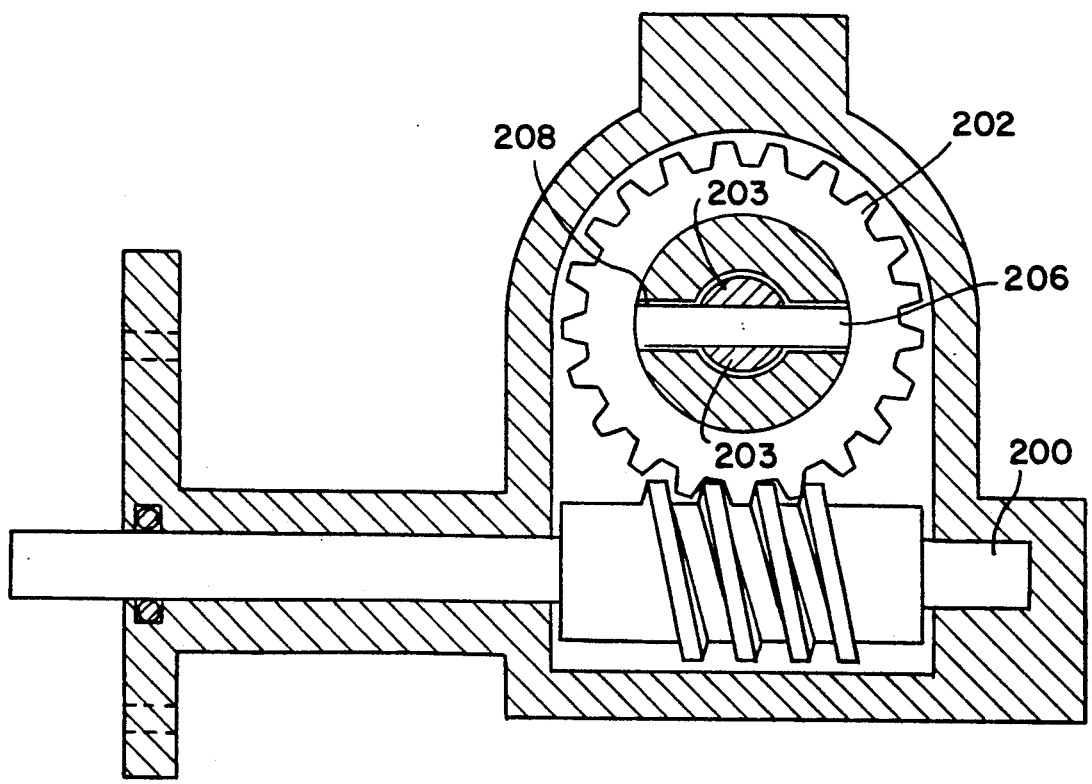
FIG. 6 is a cross-sectional view of the gear box shown in FIG. 5, taken along the lines 6—6.

A second embodiment of the present invention provides such a direct chain drive. In this embodiment, gear box 13 is shown in FIGS. 4-6 and is used in place of the gear box shown in FIGS. 3A and 3B. The gear box in this embodiment is appropriate for carrying heavy loads and/or operating in excessively wet or oily environments. This embodiment employs a direct chain drive which uses a chain and sprockets in place of the belt and pulleys previously described for driving drive wheel 4 in the first embodiment. Accordingly, a chain extends from a sprocket attached to drive wheel 4 to sprocket 220 attached to output shaft 203.

Gear box 13 consists of worm shaft 200 which is the same as the worm gear in the previous embodiment which is driven by engine 20. Worm wheel 202 meshes with worm shaft 200. However, in this embodiment, to allow an operator to selectively operate the device as an ordinary push-type wheel barrow or as a power-driven wheel barrow, instead of worm wheel 202 being permanently attached to output shaft 203, worm wheel 202 is normally rotatable about output shaft 203. Output shaft 203 is movable in the directions shown by arrows A and B. Spring 204 rests within recess 205 provided at an end of shaft 203 and normally urges shaft 203 in a direction shown by arrow A. Dog 206 extends through a hole 207 provided in output shaft 203 for engaging notch 208 in worm wheel 202. Cam 210 is mounted by any suitable method to the wheel barrow so that it is positioned adjacent to output shaft 203. Cam 210 is rotatable about shaft 230 so that when cam 210 is moved in a direction shown by arrow x to the position shown in FIG. 4, output shaft 203 moves in a direction shown by arrow B against the force of spring 204. In this position, dog 206 is disengaged from notch 208 in worm wheel 202. Accordingly, shaft 203 is freely rotatable. In this position, sprocket 220 attached to output shaft 203 is freely rotatable so that drive wheel 4 is freely rotatable through the chain, without any resistance from the gear box and engine. The wheel barrow can thus be used as a conventional push-type wheel barrow. When cam 210 is moved in a direction shown by arrow y to the position shown in FIG. 5, spring 204 urges shaft 203 in a direction A and dog 206 engages notch 208 in worm wheel 202. In this position, drive from worm shaft 200 is delivered to shaft 203 and sprocket 220. Drive wheel 4 is thus driven through the chain and the wheel barrow is operable as a power-driven wheel barrow. In this embodiment, control arm 33 (FIG. 2) is attached to cam 210 for selectively moving the cam in direction y or x so that the wheel barrow can be selectively operated as a push-type or power driven wheel barrow.

Figure 7:
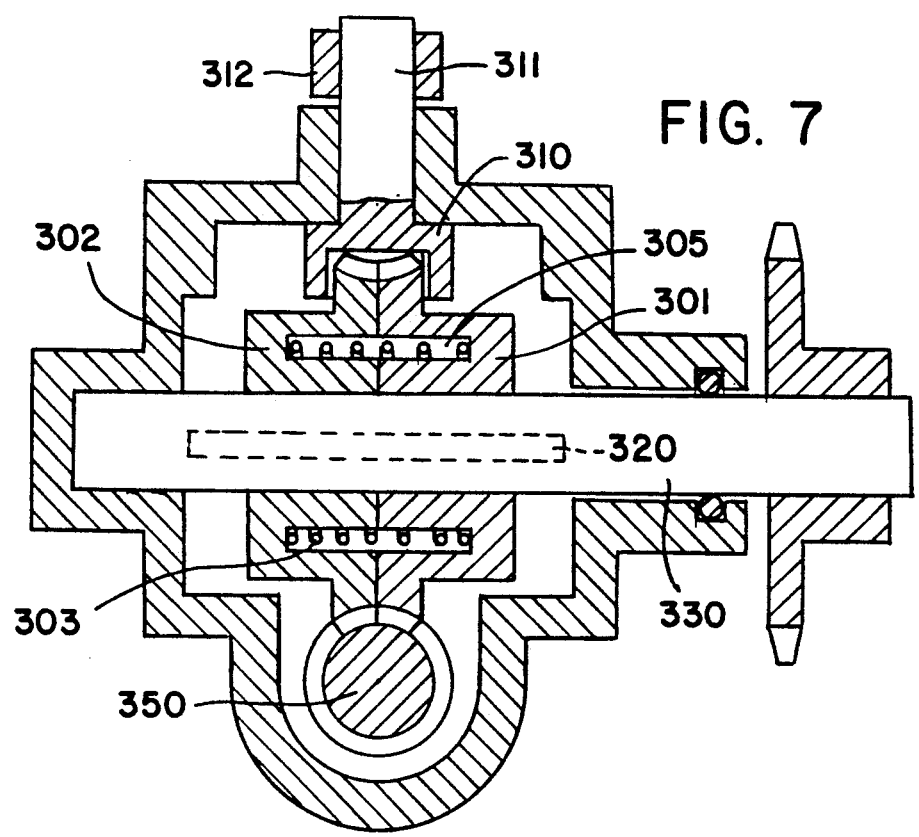
FIGS. 7 and 8 are cross-sectional views of a gear box used in another chain driven embodiment of the present invention.
Figure 8:
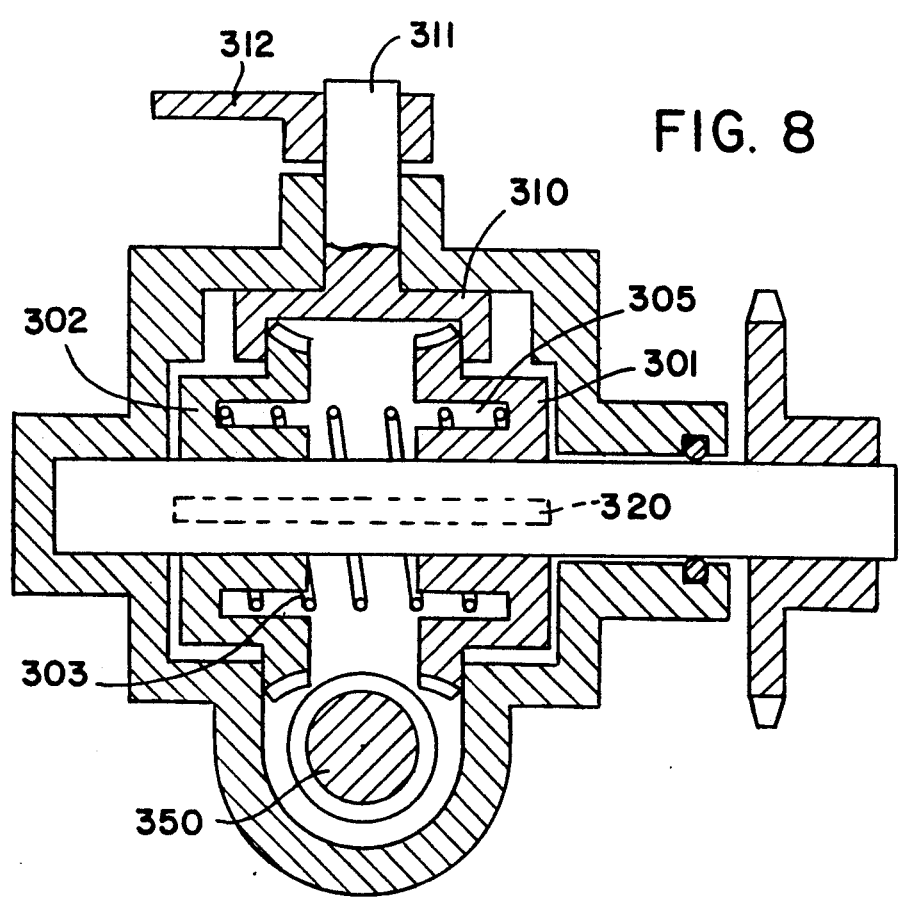

A third embodiment of the present invention is shown in FIGS. 7 and 8. The gear box in this embodiment is also used for driving the wheel barrow with a chain drive. In this embodiment, the worm wheel actually consists of two halves 301 and 302. Spring 303 is provided within cavity 305 provided in the two halves of the worm wheel. Spring 303 normally urges halves 301 and 302 apart from each other to the position shown in FIG. 8. Y-shaped arm 310 is rotatably mounted within the gear box housing and is provided for bringing halves 301 and 302 together against the spring force provided by spring 303 to the position shown in FIG. 7. Key 320 sits within a groove provided in output shaft 330 so that a portion of key 320 extends from the surface of output shaft 330. The extended portion of key 320 engages a notch provided in halves 301 and 302 and allows halves 301 and 302 to easily slide along output shaft 330. Although only one key is shown, it is possible to provide several keys and corresponding grooves in output shaft 330 and notches in halves 301 and 302. When arm 310 is rotated, halves 301 and 302 are brought together as shown in FIG. 7 so that the two halves of the worm wheel mesh with worm shaft 350. The rotational motion from worm shaft 350 is then transferred to the worm wheel and output shaft 330. A sprocket attached to shaft 330 then rotates drive wheel 4 through use of a chain. The device is thus operable as a power-driven wheel barrow. When arm 310 is moved in a direction so that parts 301 and 302 are separated from each other by the spring force, as shown in FIG. 8, the worm wheel halves do not mesh with worm shaft 350. Accordingly, output shaft 330 is freely rotatable with no resistance from worm shaft 350 and the engine. The device is thus operable as a conventional push-type wheel barrow. In this embodiment, control arm 33 is attached to arm control lever 312 for selectively rotating arm 310 so that halves 301 and 302 can be selectively meshed with worm shaft 350 and the device can be selectively used as a push-type or a power-driven wheel barrow.

Of course, it will be appreciated that the invention may take forms other than those specially described, and the scope of the invention is to be determined solely by the following claims.

What is claimed is:

1. A power driven wheel barrow comprising:
a pair of frame members, said pair of frame members being connected at a front portion thereof;
a drive wheel rotatably mounted at the front portion of said frame members;
drive means for providing rotational motion to a first shaft about an axis having a direction substantially normal to a direction of an axis of rotation of said drive wheel;
sealed gear box means for converting the rotational motion provided by said first shaft to a direction substantially parallel to the direction of rotation of said drive wheel and for outputting the converted rotational motion using a second shaft, said drive means and said sealed gear box means being attached to each other to form a compact direct-drive unit, wherein a driving pulley is mounted to said second shaft for rotating a belt used for driving said drive wheel; and
engaging means for selectively engaging and disengaging the rotational motion output by said sealed gear box means to and from said drive wheel, said engaging means comprising a member including an engaging roller, wherein the member is pivotally connected about said second shaft so that the engaging roller can be selectively moved to a position engaging the belt and to a position removed from engagement with the belt.

2. A power driven wheel barrow according to claim 1, wherein said sealed gear box means includes a worm shaft for delivering the rotational motion from said first shaft to said second shaft for providing rotational motion to said second shaft in the direction substantially parallel to the direction of rotation of said drive wheel.

3. A power driven wheel barrow according to claim 1, wherein said sealed gear box means includes a worm shaft for delivering the rotational motion from said first shaft to a worm gear, said worm gear delivering rotational motion to said second shaft in the direction substantially parallel to the direction of rotation of said drive wheel.

4. A power driven wheel barrow according to claim 1, wherein said engaging means further comprises means for supporting the belt when tension is removed from the belt.

5. A power driven wheel barrow comprising:
a pair of converging frame members, said pair of frame members being connected at a front portion thereof;
a drive wheel rotatably mounted at the front portion of said frame members;
drive means for providing rotational motion to a first drive shaft about an axis having a direction substantially normal to a direction of an axis of rotation of said drive wheel;
sealed gear box means for converting the rotational motion provided by said first drive shaft to a direction substantially parallel to the direction of rotation of said drive wheel and for outputting the converted rotational motion using a second drive shaft, said sealed gear box means being attached to said drive means to form a compact direct drive unit, wherein a driving pulley is mounted to said second drive shaft for rotating a belt used for driving said drive wheel; and selecting means for selectively providing the converted rotational motion output from said sealed gear box means to and from said drive wheel, said selecting means comprising a member including an engaging roller, wherein the member is pivotally connected about said second drive shaft so that the engaging roller can be selectively moved to a position engaging the belt and to a position removed from engagement with the belt.

6. A power driven wheel barrow according to claim 5, wherein said sealed gear box means includes a worm shaft for delivering the rotational motion from said first drive shaft to said second drive shaft for providing rotational motion to said second shaft in the direction substantially parallel to the direction of rotation of said drive wheel.

7. A power driven wheel barrow according to claim 5, wherein said sealed gear box means includes a worm shaft for delivering the rotational motion from said first drive shaft to a worm wheel, said worm wheel delivering rotational motion to said second drive shaft in the direction substantially parallel to the direction of rotation of said drive wheel.

8. A drive unit adaptable to a conventional wheel barrow including a drive wheel rotatably mounted at a front portion of a pair of frame members for converting the conventional wheel barrow to a power driven wheel barrow, said drive unit comprising:

drive means for providing rotational motion to a first shaft about an axis in a first direction;

sealed gear box means for converting the rotational motion provided by said first shaft to a second direction about an axis substantially normal to the axis of rotation of the first direction, said sealed gear box means including a worm shaft for delivering the rotational motion from said first shaft to a worm wheel, said worm wheel delivering rotational motion to a second shaft for providing the rotational motion in the second direction, wherein a driving pulley is mounted to the second shaft for rotating a belt used for driving the drive wheel, and wherein said drive means is mounted to said sealed gear box means to form a compact direct drive unit, and wherein said sealed gear box means can be attached to a conventional wheel barrow for converting the conventional wheel barrow to a power-driven wheel barrow; and engaging means for selectively engaging and disengaging the rotational motion output by said sealed gear box means to and from the drive wheel, said engaging means comprising a member including an engaging roller, wherein the member is pivotally connected about said second shaft so that the engaging roller can be selectively moved to a position engaging the belt and to a position removed from engagement with the belt.

* * * * *